CYRUS SCHWANGER, OF MOUNT JOY TOWNSHIP, PENNSYLVANIA.

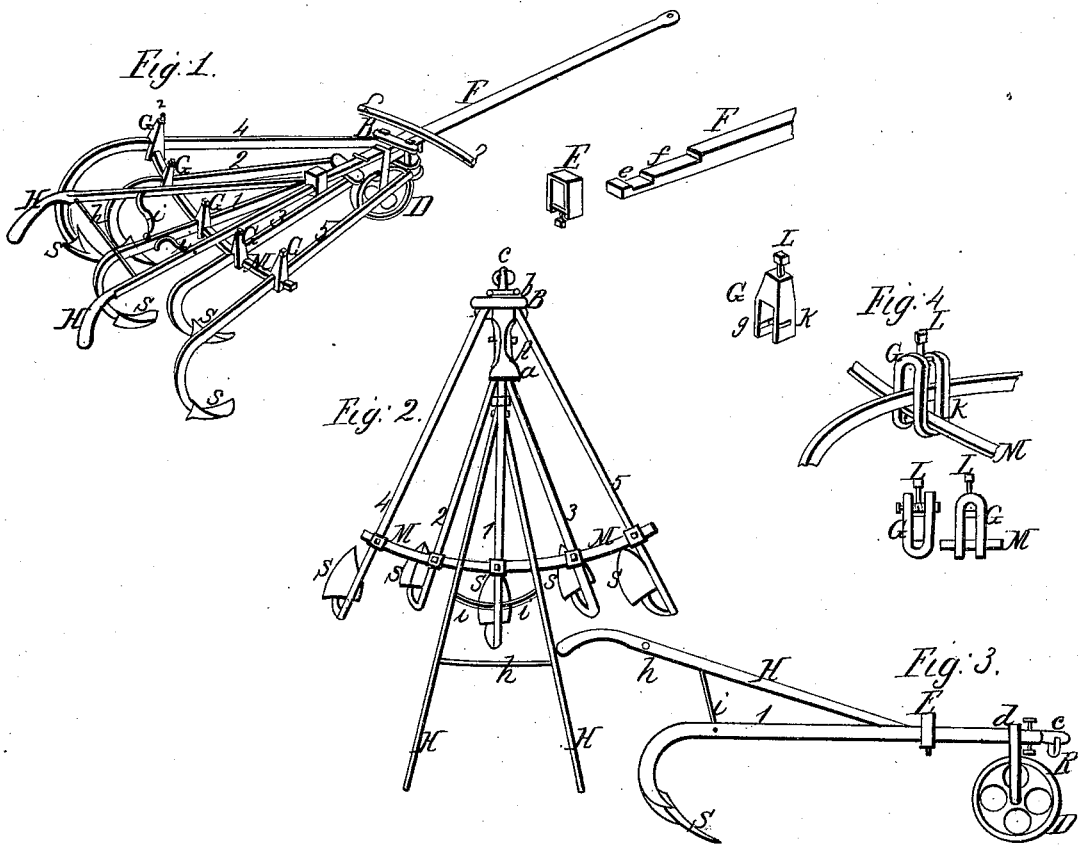

Letters Patent No. 85,862, dated January 12, 1869.

IMPROVEMENT IN CULTIVATORS.

The Schedule referred to in these Letters Patent and making part of the same.

*To all whom it may concern:*

Be it known that I, CYRUS SCHWANGER, of Mount Joy township, in the county of Lancaster, and State of Pennsylvania, have invented certain Improvements on a certain class of Cultivators; and I do hereby declare that the following is a full and exact description thereof, reference being had to the accompanying drawings, making a part of this specification, in which—

Figure 1 is a perspective view.

Figure 2, a bird's-eye view.

Figure 3, a side elevation.

Figure 4, clamp, and modified view of same.

The nature of my invention consists in the slotted adjusting-clamp for the hinged beams, and mode of connecting the pole.

To enable others skilled in the business to make and use my invention, I will proceed to describe its construction and operation.

The central iron and hooked beam 1 has side-plates in front, forming a thickened head, through which the end C projects, with a ring, R, attached for drawing or hitching to when the pole is not used. This head has vertical side-straps for a bearing for a small wheel or pulley, D; also, a pair of cross-straps, B, for the reception of the ends of the outer hook-beams 4, 5, having a headed screw-bolt for a pivot, on which they turn between said plates B. There is also another cross-strap or plate, b, on screw-bolts and nuts, with intervening space for the reception of the end of the pole to pass through, and into the stirrup E, which latter straddles the beam 1, and has a central cross-piece below for a set-screw to hold the notched end e of the pole F, which is also scarfed out at f. The inner pair of beam-hooks, 2, 3, is hinged in like manner in the head-like side-pieces. There is a curved plate, M, (formed from the radius taken on each side from the hinge-bolts,) on which the beams slide, with the set-screw holder O L, as shown.

This adjusting-clamp C is conic above, having two open sides g, which straddle the beam. These sides are provided with a slot, K, for the reception of the curved slide-guide M, and also with a square or otherwise headed binding-screw, L.

The hinged beams can be readily adjusted and held in place by the clamp C, which moves with the beams, and sustains the curved slide-bar or guide M also.

The beams are easily removed, and a single scraper applied for taking up potatoes.

The hooks of the beams are provided with removable shovels, s, which can be replaced by other shovels adapted to the various uses to which this implement can be applied for dressing, scoring, and cultivating corn, and it is easily converted into a manure-drag, and is altogether a desirable implement on the farm.

I am aware that hinged beams made of iron, and provided with various kinds of shovels, are not new, and that curved guide-bars are used in various forms, as also pulleys or wheels in front—parts I do not claim. But I am not aware of the notched pole and stirrup arrangement and the slotted straddling-clamps being ever used before in the manner shown and described.

What I claim as my invention, and desire to secure by Letters Patent, is—

1. The construction and arrangement of the slotted clamps C for the curved plate M, when made to straddle the beams 1, 2, 3, 4, and 5, adjustable by a screw-bolt, L, in the manner and for the purpose specified and shown.

2. In combination with the stirrup E and cross-plate b, the pole F, with its notch e and shoulder f, when constructed and applied in the manner and for the purpose specified.

CYRUS SCHWANGER.

Witnesses:
JACOB F. HERSHEY,
THEOPHILUS ARNDT.